INVENTOR
ARPAD MIKLOS
BY William L. Fisher Esq
HIS ATTORNEY 3,447,442
HANDLING OF CAMERAS OR THE LIKE
Arpad Miklos, 3088 E. 11 Mile Road,
Warren, Mich. 48091
Filed Sept. 6, 1966, Ser. No. 577,435
Int. Cl. G03b *17/56*
U.S. Cl. 95—86                                                                14 Claims

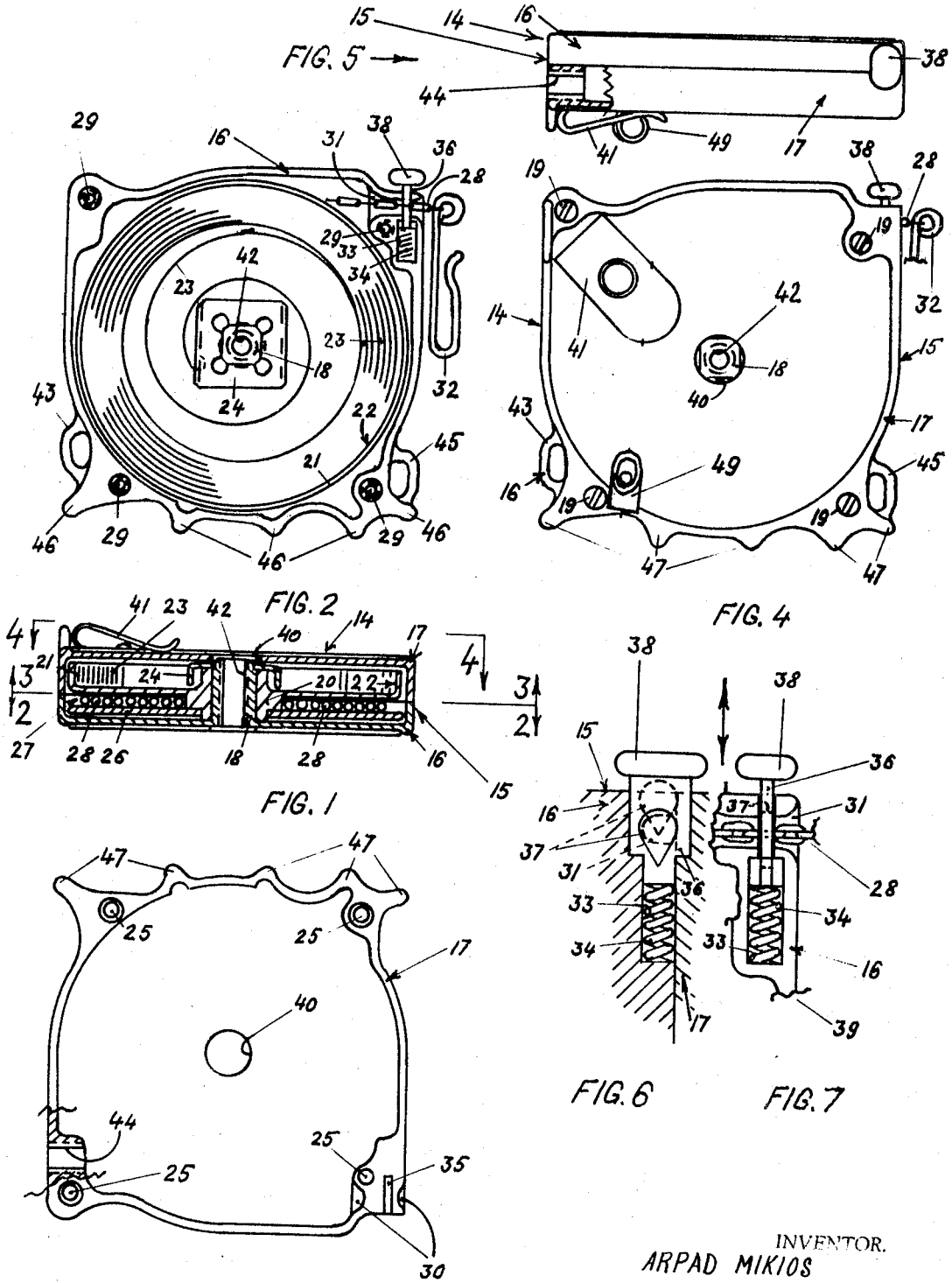

ABSTRACT OF THE DISCLOSURE

Improvements in the art of handling cameras or the like are disclosed. Said improvements comprise a flexible non-stretchable elongate member, storage means for storing said elongate member, mounting means for a camera or the like on said storage means for supporting said camera or the like in an operative position, said elongate member extractable and retractable in extended positions from its place of storage in said storage means, finger tip manually releasable locking means positively locking said elongate member fast against movement in respect to said storage means in any of said extended positions, and actuating means for moving said elongate member in respect to said storage means between any of its extended positions and its place of storage in said storage means, said storage means slidable bi-directionally lengthwise along said elongate member upon release of said locking means, said storage means including means about which said elongate member is wound in being retracted toward its place of storage in said storage means.

---

My invention relates to improvements in the handling of cameras or the like.

The principal object of my invention is the provision of simple and inexpensive but reliable and compact means for steadying cameras and the like.

The foregoing object of my invention and its advantages will become apparent during the course of the following description, taken in conjunction with the accompanying drawings, in which:

FIGS. 1, 4 and 5 are sectional, side and end elevational views, respectively, of a steadying mechanism for a camera and the like embodying my invention;

FIGS. 2–3 and 6–7 are side elevational and sectional views, respectively, of parts of said embodiment.

Figure 8:
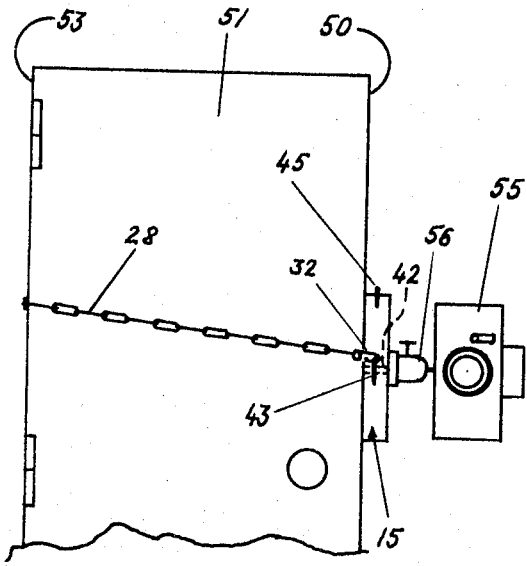
FIGS. 8–11 are views showing different uses of said embodiment.

Referring to the drawings in greater detail, said embodiment is designated 14 and comprises a pocket fitting case 15 made up of two sections 16 and 17 which interfit together as shown in FIGS. 1 and 5. The sections 16 and 17 are fastened to each other by threaded fasteners 19 which operate through apertures 25 in the section 17 and threadably engage apertures 29 in the section 16. The section 16 has a central axle hub 18 on which is rotatably supported a member 20, the periphery of which is bent toward the section 17 to form a rim 21. The main body of the member 20 and the rim 21 define a spring chamber 22 in which is carried a coiled flat spring 23. One end of the spring 23 is fastened to the case 15 via a member 24 fast on said hub 18 and the other end thereof is fastened by well known means (not shown) to the rim 21. A disc 26 carried on and made fast by well known means (not shown) to the member 20 defines a chain chamber 27 with the main body of the latter in which chamber 27 is carried a coiled chain 28. The inner end of the chain 28 is fastened by well known means (not shown) to the hub portion of the member 20 and the outer end thereof is free and passes through the case 15 via an open sided aperture 31 formed in the section 16. The aperture 31 is trumpet shaped at its opposite ends to serve as a bidirectional pilot for the chain 28. The section 17 has formed thereon, as at 30, a part of these trumpet shaped ends. To such free end of the chain 28 a hook 32 is affixed for purposes which will appear. The section 16 is provided with a chamber 33 in which a compression spring 34 operates to bias a detent member 36 outwardly of the case 15. Mating slots are provided in the sections 16 and 17 to guide the detent member 36 as shown for the slot 35 in section 17. The detent member 36 is provided with a button 38 on its outer end which projects from the case and with an opening 37 therein through which is threaded the chain 28 in passing through the aperture 31. Whenever the button 38 is manually depressed the opening 37 is positioned, as best shown in full lines in FIG. 6, so that the chain 28 passes freely therethrough. The opening 37 is pointed at its inner end, viz. tear drop shaped as shown in FIG. 6 to better capture the chain 28 and lock it in respect to the case 15 whenever the button 38 is released as shown by the dotted line position in FIG. 6 for the opening 37. The locking means 33–38 positively prevents extraction of the chain 28 from the case 15 for steadying the camera or the like and positively prevents retraction of the chain 28 into the case 15 for safety and convenient handling commensurate with the speed with which the chain 28 travels in respect to the case 15. A belt clip 41 is provided on the case by being affixed as shown to the section 17. Threaded camera mounting apertures 42 and 44 are provided in the section 16 for mounting a camera and the like in different positions in respect to the case. An aperture 40 in the section 17 is aligned with the threaded aperture 42 in the section 16 when the two sections are assembled together to form the case 15. The section 16 is provided with eyes 43 and 45 by which the hook 32 may be releasably fastened to the case. A finger grip formation is provided on the case 15 by mating indentations 46 and 47 formed as shown in corresponding end walls of the sections 16 and 17, respectively.

Figure 9:
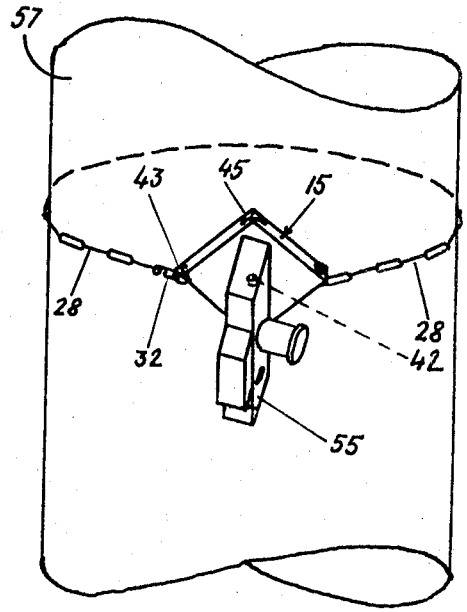
Figure 11:
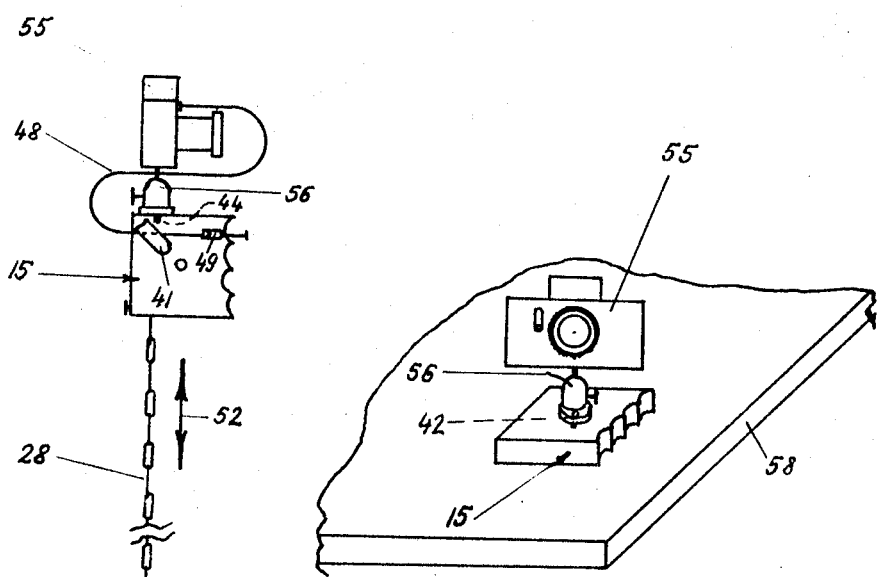
Figure 10:
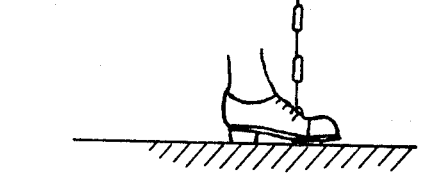

In FIG. 8 said embodiment is shown supported in a vertical position against the outer edge 50 of an opened door 51 by the chain 28 which is wrapped about the inner hinged edge 53 of the door and has its free end affixed to the eye 43 via the hook 32. The chain 28 is higher at the edge 53 than at the edge 50 due to the weight of the case 15 and the camera it supports such as the camera 55. The system including the camera 55 and the case 15 stabilizes itself about the door 51 due to the action of the spring 23 in drawing the chain 28 taut upon depression of the button 38. The final stressing of the locked chain 28 after release of the button 38 is accomplished by sliding of the case 15 and the camera 55 it supports by gravity along the edge 50. The camera 55 is shown in FIGS. 8–11 fastened to the case 15 via a conventional ball and socket connector 56 which threads in the base of the camera 55 and one of the mounting apertures 42 and 44 in the case 15. In FIG. 9 said embodiment is shown supported in a vertical position against a near vertical column 57, such as the trunk of a tree, or the like, by the chain 28 which is wrapped about said column 57 and has its free end affixed to the eye 43 via the hook 32. The chain 28 is higher at the back of the trunk than at the front thereof due to the weight of the case 15 and the camera 55 is supports. This system stabilizes itself about the column 57 as before described for the door 51. In FIG. 10 said embodiment is shown held in a free standing position and steadied therein by upward pull upon the chain 28 which is held against the ground by being stepped upon by the user of the camera and the like. Any user height can be instantly accommodated by virtue of the positive bidirectional lock 33–38 on the chain 28. The lock 33–38 is finger tip manually releasable so that the case 15 is immediately slidable bi-directionally lengthwise along the chain 28 as shown and indicated by the arrow 52 in FIG. 10 upon release of said lock. In this way the adjustment of the user height is swiftly and conveniently accomplished. The combination of holding the chain 28 while depressing the button 38 makes for safety and convenience in the instantaneous extraction and retraction of the chain 28 in respect to the case 15. In the position shown in FIG. 10 the camera and the like can be tilted at any angle and swung in an arc for any given user height to follow moving subjects. In FIG. 11 said embodiment is shown supported in a horizontal position on a portion 58 of a table or other horizontal support to illustrate how the flat side of the case 15 can be used against a flat surface, as for example, by pushing such flat case side against a wall or any angularly positioned flat surface. 49 designates an adapter carried fast on the section 17 to which may be affixed a conventional shutter release cable 48 for remotely actuating the camera shutter. The adapter 49 is positioned on the section 17 so that the shutter release cable 48 can be inserted beneath the belt clip 41 to assist in steadying the shutter release cable in respect to the case 15.

It will thus be seen that there has been provided by my invention improvements in the art of handling cameras and the like in which the object hereinabove set forth together with many thoroughly practical advantages has been successfully achieved. Among such advantages that should be specifically mentioned are: the case 15 can serve as a camera handgrip; the case 15 is flat and light and easily stored in a pocket or purse or fastened to a belt or to a camera and the like to have on hand; the chain 28 can be suitably marked in selected distance measurements to facilitate estimating the camera-subject distance; the wedge shaped construction 37 on the detent 36 moves transversely across the line of movement of the chain 28 and positively locks it in both directions of its movement and thereby isolates the drum system 20–23, 26–28 from any amount of pull tending to extract the chain 28 from the case 15 and prevents unwanted retraction of the extended portion of the chain 28; in every case of use of the embodiment 14 it is very easy and not at all time consuming to set up; moreover the embodiment 14 serves to eliminate or reduce movement of the object steadied to secure better observation in the case of binoculars or firearms and sharper pictures in the case of still shot cameras or movie cameras. While a preferred embodiment of my invention has been shown and described it should be understood that variations and changes may be resorted to without departing from the spirit thereof as set forth in the appended claims.

What is claimed is:

1. In the art of handling cameras or the like, the improvement comprising a flexible non-stretchable elongate member, storage means for storing said elongate member, mounting means for a camera or the like on said storage means for supporting said camera or the like in an operative position, said elongate member extractable and retractable in extended positions from its place of storage in said storage means, finger tip manually releasable locking means positively locking said elongate member fast against movement in respect to said storage means in any of said extended positions, and actuating means for moving said elongate member in respect to said storage means between any of its extended positions and its place of storage in said storage means, said storage means slidable bi-directionally lengthwise along said elongate member upon release of said locking means, said storage means including means about which said elongate member is wound in being retracted toward its place of storage in said storage means.

2. The improvement as claimed in claim 1, retracting means for retracting said elongate member from any of its extended positions toward its place of storage in said storage means.

3. The improvement as claimed in claim 2, releasable fastening means on the free end of said elongate member and cooperating releasable fastening means on said storage means for releasably fastening said free end and said storage means together for forming a closed camera or the like supporting loop about a supporting object.

4. The improvement as claimed in claim 2, said locking means bi-directionally operative to lock said elongate member in each of its directions of movement in respect to said storage means.

5. The improvement as claimed in claim 1, said storage means including a drum about which the elongate member is wound in being retracted toward its place of storage in said storage means.

6. The improvement as claimed in claim 2, said retracting means including spring means operative upon release of said locking means for instantaneously retracting said elongate member from any of its extended positions toward its place of storage in said storage means.

7. The improvement as claimed in claim 5, said drum rotatable in respect to said camera or the like mounting means.

8. The improvement as claimed in claim 7, spring means operative upon release of said locking means and upon the drum to rotate it in one rotational direction to retract said elongate member toward its place of storage in said storage means.

9. The improvement as claimed in claim 1, said locking means having a detent member which penetrates the confines of the cross-sectional profile of said elongate member, and yieldable means normally holding said detent member in lock position.

10. The improvement as claimed in claim 1, said elongate member comprising a chain, said locking means including a detent member which captures said chain in locking the same in respect to said storage means, and yieldable means normally holding said detent member in lock position.

11. The improvement as claimed in claim 5, said storage means including a container for the drum, said container having a hand grip formed along an end wall thereof.

12. The improvement as claimed in claim 5, said storage means including a container for the drum, said container having steadying means for steadying the camera or the like against a support.

13. The improvement as claimed in claim 12, said steadying means comprising at least one flat face on said container for pushing against a flat support.

14. The improvement as claimed in claim 5, said storage means including a container for the drum, said container having means thereon for steadying in respect thereto a shutter release cable.

References Cited

UNITED STATES PATENTS 1,766,090   6/1930   Worsching _____ 95—86

FOREIGN PATENTS 1,272,406   8/1961   France.

JOHN M. HORAN, *Primary Examiner.*